United States Patent [19]

Singbartl

[11] Patent Number: 5,064,967
[45] Date of Patent: Nov. 12, 1991

[54] HOUSING CONTAINING AN ELECTRICAL COMPONENT AND HAVING A CABLE HEAD-THROUGH DEVICE WITH STRAIN RELIEF

[75] Inventor: Günther Singbartl, Hanover, Fed. Rep. of Germany

[73] Assignee: WABCO Westinghouse Fahrzeugbremsen GmbH, Hanover, Fed. Rep. of Germany

[21] Appl. No.: 358,026

[22] Filed: May 26, 1989

[30] Foreign Application Priority Data

Jun. 15, 1988 [DE] Fed. Rep. of Germany ....... 3820378

[51] Int. Cl.$^5$ .......................... H05K 5/03; H01R 13/58
[52] U.S. Cl. ..................................... 174/52.3; 439/456
[58] Field of Search .................. 174/52.3, 65 R, 65 G, 174/135, 153 G, 155; 310/71, 155, 168, 171; 324/174; 336/90, 92; 439/449, 456, 457, 458, 459, 460, 463, 465

[56] References Cited

U.S. PATENT DOCUMENTS 3,252,024  5/1966  Loudon ............................ 310/155
4,487,386 12/1984  Hehl ............................ 174/153 G X

FOREIGN PATENT DOCUMENTS 806686   6/1951  Fed. Rep. of Germany .... 174/65 R
3530288  3/1987  Fed. Rep. of Germany .
2068176  8/1981  United Kingdom ................ 439/459

Primary Examiner—Laramie E. Askin
Attorney, Agent, or Firm—Horst M. Kasper

[57] ABSTRACT

A strain relief device for an electrical cable disposed in a cable lead-through system for a housing containing an electrical component. The housing includes a cup-shaped housing portion and a closure portion. The strain relief includes two opposingly moving elements for clamping the cable. The two elements of the strain relief are braced against an inside wall of the cup-shaped housing portion. The closure portion is formed by one of the two elements of the strain relief.

44 Claims, 2 Drawing Sheets

HOUSING CONTAINING AN ELECTRICAL COMPONENT AND HAVING A CABLE HEAD-THROUGH DEVICE WITH STRAIN RELIEF

FIELD OF THE INVENTION

The present invention relates, in general, to a cable lead-through system for a housing member which contains therein at least one electrical component and, more particularly, this invention relates to a cable lead-through system for a housing containing an impulse tachometer generator in which such cable lead-through system includes improved strain relief capability at the cable.

BACKGROUND OF THE INVENTION

An impulse tachometer generator which includes a housing featuring a two-part design is known in the See German Patent No. DE-OS 35 20 288 for a prior art. See German Printer Application 35 30 288 Al for a teaching of such an impulse tachometer generator. In this prior art design, the lower housing part consists of a metallic material, while the upper housing part is manufactured from a synthetic-type material, for example, a suitable plastic. As produced, this lower housing part is cup-shaped, and the upper housing part is designed primarily as a closing member to seal such cup-shaped lower housing part. Such upper housing part includes a cable opening.

As illustrated in the drawing of the above-mentioned reference, the upper housing part extends partially into the lower housing part. This overlapping area between such upper housing part and lower housing part is designed as a support for a pole pin, and a permanent magnet, as well as for a coil which surrounds the pole pin. The front portion of the upper housing part, which faces away from the pole pin, includes a cavity that can be closed with a cover member. Busbars lead into this cavity. Such busbars are connected to the coil, as well as to electric cable leads. The electric cable emerges from the housing and serves to make the necessary electrical connection between the electric component contained within the housing, which electric component is designed as a coil, and an electrical device located external of the housing and also separate from the same.

As previously mentioned, the upper housing part includes a cable lead-through for such electric cable. Such cable lead-through is formed by an opening positioned in the wall of the upper housing part. Located on the wall adjacent the opening, a series of projections are provided which extend to the cable. These projections are designed in a barb-like fashion so that they will catch on the sheathing material surrounding the conductor wire of the electric cable. In this manner, these projections provide some degree of strain relief for such electric cable. However, the strain relief of the cable lead-through, designed in this manner, will have a number of significant disadvantages. For example, it is conceivable that such series of projections, which are molded into the cable lead-through, will not achieve a requisite amount of clamping effect at the electric cable. Insufficient clamping effect may occur due to manufacturing tolerances. With insufficient clamping results, the forces that occur during tensile stress at the electric cable will not be transferred from the cable sheathing material via the series of projections within the cable lead-through onto the housing. Instead, these forces will be transferred onto the cable conductors and/or the electrical component contained in the housing and connected to these electric cables. Obviously, this is not a desirable condition.

One detrimental effect may be that the individual conductors of such electrical cable may break, or the electrical component within the housing may be damaged, thus causing a malfunction of the system in which it forms a part.

SUMMARY OF THE INVENTION

The present invention provides an apparatus which includes an improved cable lead-through device. The apparatus includes a housing which contains therein at least one electrical component, such as an impulse tachometer generator, and includes the following characteristics. The housing includes a generally cup-shaped housing portion, and a closure portion to close off such cup-shaped housing portion. The electrical component contained within the housing is connected with an electrical device located external to the housing by an electrical cable connected at one end thereof to such electrical component. The electrical cable is passed out of the housing for connection to such electrical device at a second end thereof. A strain relief device provides the requisite amount of strain relief for the electrical cable. Such strain relief device includes two opposingly movable elements for clamping such cable. These two elements of the strain relief device are braced against the wall of the cup-shaped housing portion. In addition, they are pretensioned and positioned substantially vertically to the wall of the cup-shaped housing portion. One of these two elements of the strain relief device serves as the closure portion for the cup-shaped housing portion.

OBJECTS OF THE INVENTION

It is, therefore, one of the primary objects of the present invention to provide an apparatus which includes a cable lead-through device which includes a strain relief device that will achieve reliable strain relief of an electrical cable used to connect an electrical component contained within a housing to an electrical device located external to such housing.

Another object of the present invention is to provide an apparatus which includes a cable lead-through device in which a reliable strain relief for the electrical cable is achieved by a relatively large support area provided by cable lead-through members forming the strain relief device at an inside wall of a cup-shaped housing portion of the housing.

Still another object of the present invention is to provide an apparatus which includes a cable lead-through device which, due to the strain relief device being divided in design, makes it easy to compensate for manufacturing-related tolerances at the strain relief device or at the opening in the housing adjacent the strain relief device.

Yet another object of the present invention is to provide an apparatus which includes a cable lead-through device in which no additional part is required to seal the cup-shaped housing portion, due to one of the two parts of the strain relief device being designed as a seal member for such cup-shaped housing portion.

In addition to the various objects and advantages of the apparatus discussed above, various other objects and advantages of the present invention will become more readily apparent to those persons skilled in the electrical equipment art from the following more detailed description of the invention when such description is taken in conjunction with the attached drawing Figures and with the appended claims.

BRIEF DESCRIPTION OF THE INVENTION

Although the present invention is not to be limited thereto or thereby, it will be explained as it relates to an impulse tachometer generator.

Figure 1:
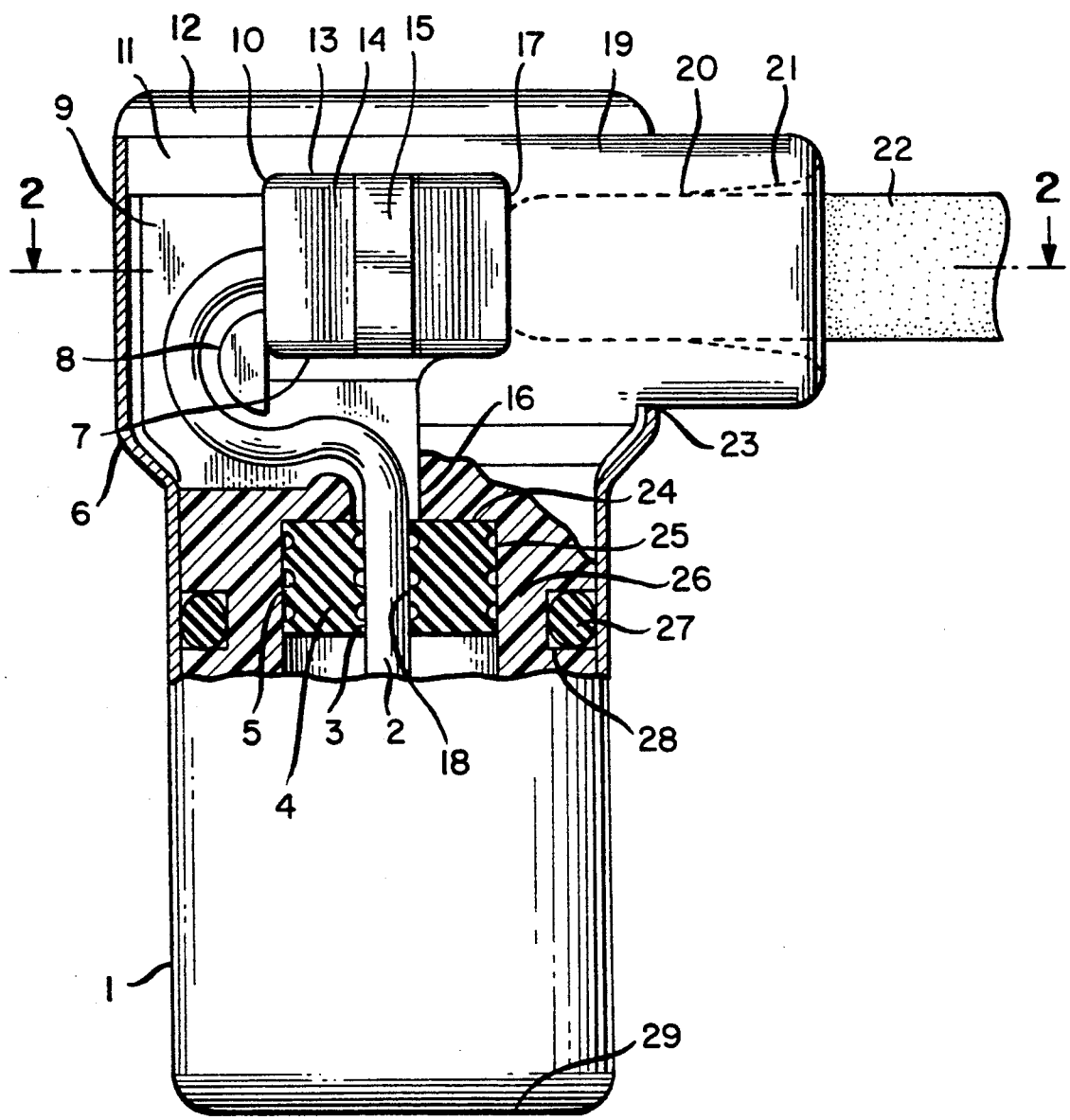
FIG. 1 is a side elevational view, partially in cross-section, which illustrates an impulse tachometer generator with a presently preferred cable lead-through device featuring a strain relief device.

Now refer more particularly to FIG. 1, which illustrates a two-piece housing with the presently preferred cable lead-through device. Contained within the housing, but not shown in any detail, is a magnet coil, a pole pin, and a permanent magnet.

As shown, the housing includes a cup-shaped housing portion 1 which has a widened area 6 located adjacent the open end thereof, and a closure portion consisting of element 11 having an integral upper portion 12. Such closure portion 11 will be discussed in greater detail hereinafter.

The cable lead-through device of this invention is designed to receive an electrical cable. Such electrical cable consists of at least one conductor wire 2 and a sheathing material 22. The sheathing material 22 surrounds the conductor wire 2. Such electrical cable serves to connect an electrical component (not shown) that is located in the interior of the housing with an electrical device (not shown) located on the outside of the housing. Although the invention is not limited thereto or thereby, such electrical component may be a coil of an impulse tachometer generator, and such electrical device may be a microprocessor.

A strain relief device, to be discussed in greater detail below, is provided to enable strain relief for the electrical cable in order to prevent undue damage to the conductor wire 2 or conductor wires of such electrical cable, or possible damage to the electrical components contained within such housing that are connected to such electrical cable. Such damage can occur when, for example, undue tensile stress is placed on such electrical cable.

The strain relief device is comprised of a pair of opposingly movable elements: namely, a first movable element which is the closure portion 11, and a second movable element 14 which moves in a direction opposite to such first movable element 11. The first movable element 11 and the second movable element 14 serve as a clamping means for the electrical cable.

The first movable element 11 of the strain relief device is configured as a cylindrical body portion which, with the major portion of its axial extension, is inserted into the widened on expanded area 6 of the cup-shaped housing portion 1. The first movable element 11 of the strain relief device, including its upper portion 12, is utilized as the closure portion of the housing. In addition, such upper portion 12 of the first movable element 11 has a diameter measurement such that it will rest on the edge of the widened area 6 around the opening located adjacent the open end of the cup-shaped housing portion 1. When assembled, the peripheral surface of the upper portion 12 of the first movable element 11 is flush with the outer shell surface of the widened area 6 of such cup-shaped housing portion 1.

The first movable element 11, including the upper portion 12, of the strain relief device serves as the closure portion of the housing, and has a projecting portion 19 which is unitary therewith. Such projecting portion 19 is oriented substantially transversely to the longitudinal axis of the cup-shaped housing portion 1.

In the first movable element 11, including the upper portion 12, of the strain relief device, which also serves as the closure portion of the housing, an opening 9 is provided for the electrical cable. Such opening 9 is located transversely to the longitudinal axis of such closure portion. The opening 9 is bounded, in part, by a web-like wall that runs transversely to the longitudinal axis of the closure portion. The opening 9, adjacent its free side, includes a guide member 8. This guide member 8 is formed with a substantially convex surface.

Another opening 20 for the electrical cable, and which adjoins the opening 9, is provided in the projecting portion 19. Such opening 20 runs coaxially with the opening 9 located in the closure portion. Such opening 20 in the projecting portion 19 and the connecting opening 9 in the closure portion are adapted to receive that portion of the conductor wire 2 which is surrounded by the sheathing material 22.

The closure portion 11 includes a recess 13. Such recess 13 runs transversely to the longitudinal axis of the opening 9. Such recess 13 extends from the outer shell surface of the closure portion 11 and 12 to the opening 9 and terminates in such opening 9.

Figure 2:
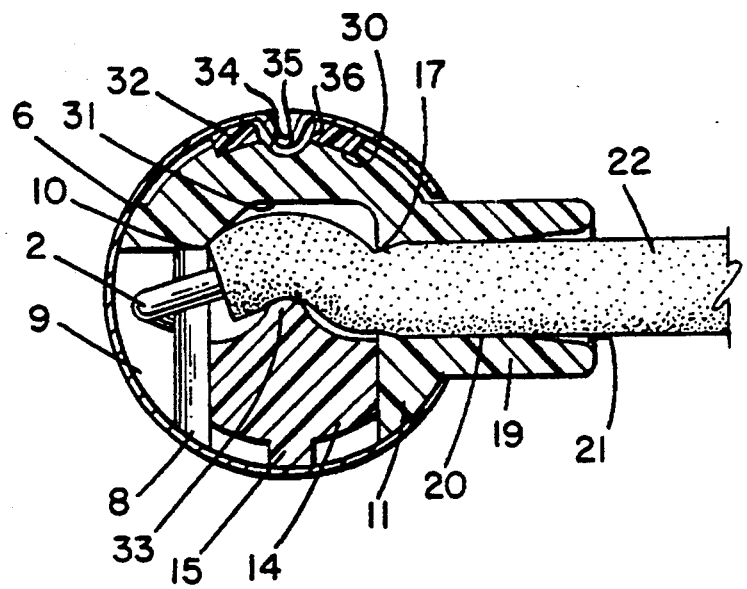
FIG. 2 is a sectional view of the strain relief device taken along the lines 2—2 of FIG. 1.

An element 14, which functions as a clamping means, is positioned for axial movement in the recess 13. Such clamping means 14 can move in a direction both toward the electrical cable or, respectively, away from such electrical cable. The combination of the closure portion 11 and the clamping means 14 forms the presently preferred strain relief device for the electrical cable. In the embodiment of the clamping means 14 which is illustrated in FIG. 2, such clamping means 14 includes a projection 15 extending outwardly therefrom on a side of such clamping means 14 which faces away from the electrical cable. In the direction of the longitudinal axis which extends to the sheathing material 22 of the conductor wire 2, the dimensions of the clamping means 14 are such that after inserting the closure portion 11 (with the clamping means 14 positioned in the recess 13) into the cup-shaped housing portion 1, such clamping means 14 and projection 15 will be supported at the inside wall of the widened area 6. In addition, adjacent the side which faces the electrical cable, the clamping means 14 presses such electrical cable against a section of the inside wall that is bounding the opening 9 which receives the electrical cable, or against a part that can be connected to this section of the wall. This part is not shown here. In this position, the clamping means 14 elastically deforms such electrical cable. Thus, the closure portion 11 and the clamping means 14, which form the strain relief device of the present invention, brace themselves against the inside wall of the cup-shaped housing portion 1. Such strain relief device is pretensioned, and positioned vertically to such inside wall of the cup-shaped housing portion 1.

As viewed in the direction of the longitudinal axis of the closure portion 11, the recess 13 for receiving the clamping means 14 therein is positioned such that after insertion of the closure portion 11 (with the clamping means 14 in the recess 13) into the cup-shaped housing portion 1, the recess 13 will be located in the portion of the closure portion 11 that is surrounded by the cup-shaped housing portion 1.

Figure 3:
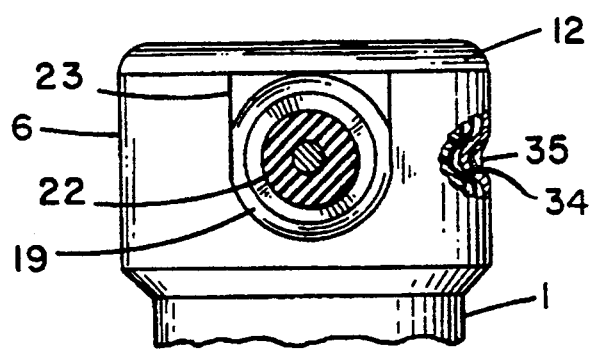
FIG. 3 is a fragmented end view illustrating an area of a cup-shaped housing portion including a slot to receive a projecting portion of a closure portion.

As illustrated in FIG. 3, a generally U-shaped slot 23 is provided in the wall of the cup-shaped housing portion 1. Such U-shaped slot 23 receives therein the projecting portion 19 connected to or engageable with the closure portion 11. Such projecting portion 19 extends radially outward from the closure portion 11. In the direction of the longitudinal axis of the cup-shaped housing portion 1, the slot 23 is both positioned and dimensioned such that the slot 23 will extend over a substantial portion of the axial length of the closure portion 11. Furthermore, the slot 23 is open in the direction of the rim of the cup-shaped housing portion 1 which points toward the upper portion 12 of such closure portion 11.

Among other things, the slot 23 and the projecting portion 19 serve the primary function of safeguarding the closure portion 11 against a twisting movement relative to the cup-shaped housing portion 1, such twisting movement occurring when the apparatus is in an assembled relationship.

The opening 9, provided to receive therein the electrical cable, includes a first catch means for engagement with the face of the sheathing material 22 of the conductor wire 2. In the presently preferred embodiment of the invention, the first catch means comprises a graduation 10, formed as a part of closure portion 11, and a surface of a guide member 8 that is facing the front of the sheathing material 22 of the conductor wire 2. The first catch means is located on that side of the opening 9 which is substantially opposite the free end of the opening 9 that leads out of the closure portion 11. Although not presently preferred, if the guide member 8 is omitted, the graduation 10 alone is sufficient to serve as the first catch means.

On the side located opposite the first catch means composed of graduation 10 and a surface of guide member 8, a continuous projection 17 is provided on the wall which bounds the opening 9. This continuous projection 17 generally extends to the sheathing material 22 of the conductor wire 2, and serves the function of a second catch means. As can be seen in the drawings, the continuous projection 17 is positioned such that it permits the introduction of the electrical cable into the opening 9 in the direction toward the first catch means. On the other hand, the continuous projection 17, after assembly of the apparatus, substantially prevents the movement of the electrical cable away from the first catch means. That is, the continuous projection 17 utilizes the "barb principle".

This presently preferred arrangement of the first catch means, composed of graduation 10 and a surface of guide member 8, and the continuous projection 17 which, in addition to serving as the second catch means, includes the added function of acting as a seal, causes the electrical cable to be generally fixed in the direction of its longitudinal axis after final assembly of the apparatus.

As illustrated in FIG. 2, a cavity 31 is provided in the wall bounding the opening 9 on the side which is generally opposite the recess 13 for reception of the clamping means 14. The electrical cable is generally curve-shaped within the opening 9.

In order to intensify the curve-shaped deformation of the electrical cable, in the presently preferred embodiment of the invention, a projection 33 which extends to the sheathing material 22 of the conductor wire 2 is provided on the side of the clamping means 14 that faces the electrical cable. The are of the projection 33 which comes into contact with the sheathing material 22 has a contour which generally matches the contour of the outer surface of such sheathing material 22.

An opening 20 for the electrical cable 2 and 22 is provided in the projecting portion 19. Such opening 20 is radially located at the closure portion 11. Such opening 20 serves as a guide for the electrical cable. The free end area of the opening 20 is configured so as to flare out like a funnel 21. Such funnel 21 makes possible a slight diversion of the electrical cable without any significant damage occurring to such electrical cable.

On the side of the closure portion 11 which faces the interior of the cup-shaped housing portion 1 a support member 26 for a sealing device is provided. The sealing device will be discussed in greater detail hereinafter. In the presently preferred embodiment of this invention, the closure portion 11 together with the support member 26 form a single structural unit. The sealing device functions to seal the housing interior against the opening 9 for the electrical cable, as well as against the assembly orifice located within the cup-shaped housing portion 1 for the closure portion 11.

The sealing device generally consists of a first sealing element and a second sealing element. Such first sealing element and second sealing element are supported by the support member 26 or, respectively, can be mounted in or on such support member 26.

The first sealing element is configured as a disk-shaped seal member 4. The disk-shaped seal member 4 is mounted in a graduated recess 16 and 25 in the support member 26 in the area which has the larger diameter. In this embodiment of the invention, the support member 26 represents a portion of the closure portion 11. The disk-shaped seal member 4 has an opening 18 for the conductor wire portion 2 of the electrical cable. In the case of a multiwire electrical cable, such disk-shaped seal member 4 will include a separate opening for each conductor wire of the multiwire electrical cable, according to the presently preferred embodiment of the invention. The opening 18 for the conductor wire 2 is configured such that the wall bounding such opening 18 contacts such conductor wire 2 to form a seal. Alternatively, projections 3 on this wall may contact the conductor wire 2 to form the seal. Further, the disk-shaped seal member 4 contacts the wall bounding the recess 25 of the support member 26 with its peripheral surface, or with continuous projections 5 to form a seal. Such continuous projections 5 are located on such peripheral surface of such disk-shaped seal member 4.

A continuous groove 28 is provided in the outer shell surface of the support member 26. This continuous groove 28 holds a sealing ring member 27. Such sealing ring member 27 functions as the second sealing element of the sealing device. To form a seal, the sealing ring member 27 contacts the support member 26 in the continuous groove 28 with its inner side and contacts the interior wall of the cup-shaped housing portion 1 with its outer surface.

Thus, the first sealing element 4, configured as a conductor wire 2 seal, seals off the interior of the cup-shaped housing portion 1 against the opening 9 for the electrical cable 2. Such first sealing element 4 further provides a seal against the cavities within the strain relief device 11 and 14.

On the other hand, the sealing ring member 27, forming the second sealing element, seals off a potential gap that may be formed between the inside wall of the cup-shaped housing portion 1 and the strain relief device 11 and 14. The part 11 of the strain relief device 11 and 14 at the same time represents the closure portion for such cup-shaped housing portion 1 of the housing.

The support member 26 for the sealing elements 4 and 27 may, as mentioned previously, form one single unit with the closure portion 11. This enables a molded unit to be utilized and, therefore, provides economy in manufacture. However, such support member 26 may, alternatively, be formed as a separate unit and be positioned in the cup-shaped housing portion 1 in a manner such that it is located between such closure portion 11 and that area of the housing interior which contains the electrical component. The support member 26 or, respectively, the brace for the sealing element or sealing elements may have a circular cross-sectional shape or, alternatively, an off-round cross-sectional shape. In any event, the cross-sectional shape of such support member 26 will preferably be adapted to the cross-sectional shape of the widened out area 6 of such cup-shaped housing portion 1 of the housing.

Generally, the clamping means 14, which interacts with the closure portion and 11, may have any predetermined shape desired. The recess provided in such closure portion 11 which receives the clamping means 14, however, must always be configured and dimensioned such that the clamping means 14 cannot only be secured but also is free to move in this recess. The projections 33 and 15, as best seen in FIG. 2, which are provided on the clamping means 14 may be omitted if desired. However, when such projections 33 and 15 are omitted from the clamping means 14, one must ensure that the clamping means 14 in the direction of its axis which extends to the electrical cable, has the proper dimensions so that when the strain relief device of this invention has been mounted in the housing, the clamping means 14 will penetrate the opening 9 for the electrical cable. Such penetration of the clamping means 14 into the opening 9 must be far enough for the electrical cable to be securely retained by the clamping means 14 and the wall of the cavity of the element 11 of the strain relief device functioning as the closure portion of the housing which is opposite the clamping means 14.

As best illustrated in FIG. 2 and FIG. 3, in order to secure the closure portion 11 into the cup-shaped housing portion 1, an indentation 34 is provided in the outer shell surface of such closure portion 11 into which indentation 34 a tab-like projection 35 which has been stamped or pressed into a wall of the cup-shaped housing portion 1 is engaged. In this vicinity of the cup-shaped housing portion 1 and the closure portion 11, a plate member 32 having an opening 36 formed therein is provided. Plate member 32 is positioned within the housing so that it rests in a recess 30 formed in the outer shell surface of the closure portion 11. The tab-like projection 35, formed in the wall of the cup-shaped housing portion 1, extends through the opening 36 formed in the plate member 32. Such plate member 32 serves the function of reinforcing that area of the closure portion 11 which receives the tab-like projection 35. In addition, the plate member 32 will substantially prevent an undesirable deformation of the wall of the cup-shaped housing portion 1 in the area of such wall where the tab-like projection 35 is to be formed by such stamping or pressing process. Of course, as will be understood by persons skilled in the art, the cable lead-through device of the present invention may also be constructed in a manner such that the electrical cable can be passed out of the cup-shaped housing portion 1 having an orientation in the direction of the longitudinal axis of such cup-shaped housing portion 1 and the closure portion 11. In this particular alternative embodiment of the cable lead-through, device, the guide member 8 for the at least one conductor wire 2 of the electrical cable may be omitted from the final assembly.

The assembly of the presently preferred embodiment of the apparatus which includes the cable lead-through device of this invention will now be described in some detail.

The electrical cable is first introduced into the closure portion 11 through the opening 20 provided in the projecting portion 19. Such electrical cable then passes through the opening 9 formed in such closure portion 11. During this assembly operation, such electrical cable is introduced into the closure portion 11 for a predetermined distance, which predetermined distance is the distance when the face of the sheathing material 22 comes to a stop against the graduation 10. Thereafter, the at least one conductor wire 2 of the electrical cable 2 and 22 is positioned around the guide member 8 and passed through the graduated recess 16, and 25 of the support member 26 for the sealing elements 4 and 27.

At this point in the assembly of the presently preferred embodiment of the invention, the first sealing element 4, that is to function as a seal for the at least one conductor wire 2, is slipped sufficiently far enough onto the conductor wire 2 or conductor wires of the electrical cable so that such first sealing element 4 will be positioned in the graduated recess 16 and 25 of the support member 26. In this position, the first sealing element 4 will have its front, facing the closure portion 11 resting on the surface 24 of the graduated recess 16 and 25.

During one of the assembly steps described above, the second sealing element 27, which functions as a sealing ring, will have been inserted into the groove 28 formed in the outer shell surface of the sealing means support member 26.

After completion of the above-described assembly procedures, the presently preferred clamping means 14 can be inserted into the recess 13 of the closure portion 11. Such clamping means 14 is pressed into such recess 13 a predetermined distance such that the projection 15 of the clamping means 14 will be substantially flush with the adjoining area of the shell surface of the closure portion 11.

With the clamping means 14 positioned in the recess 13, the closure portion 11 is then inserted toward the bottom 29 of the cup-shaped housing portion 1. As thus assembled, the upper portion 12 of the closure portion 11 comes to rest on the rim of such cup-shaped housing portion 1.

Subsequently, the tab-like projection 35, of the cup-shaped housing portion 1 wall, which engages in the indentation 34 in the outer shell surface of the closure portion 11 is formed. The forming of such tab-like projection 35 in the wall of the cup-shaped housing portion 1 may be accomplished, for example, by stamping, pressing, or some other suitable means or method.

Prior to the last two assembly procedures described above, it is obvious that a connection of the at least one conductor wire 2 or wires of the electrical cable to the electrical component must be made, and that such electrical component must be inserted into position within the housing.

It can be seen from the above description of the present invention, as well as its assembly, that according to one advantageous refinement of the invention, the electrical cable, by means of a projection 33 on one element of the strain relief device and a cavity 31 provided substantially opposite of such projection 33 at the respective other element of such strain relief device, is flexibly-shaped in such a manner that the portion of the electrical cable positioned within the strain relief device is curve-shaped. This measure serves to reduce to a minimum the relative movement which can occur between the at least one conductor wire 2 or wires of the electrical cable and the cable sheathing material. Such relative movement generally will occur when the electrical cable is subjected to a tensile stress. In the presently preferred embodiment of the invention, it is also advantageous that the outer shell of one element of the strain relief device includes an indentation 34 into which engages a tab-like projection 35, produced by stamping, for example, a wall of the cup-shaped housing portion 1, by which the strain relief device, that at the same time forms the sealing for the housing, is being secured against a shifting motion in the direction of its longitudinal axis.

According to another advantageous embodiment of the present invention, the cable lead-through device includes a firs catch means, composed of graduation 10 and a surface of guide member 8, and a continuous projection 17 which serves as a second catch means 17 for the electrical cable. In this embodiment, the continuous projection 17 is preferably configured so as to act upon the sheathing material 22 like a barb, so as to retard removal of the electrical cable from the housing after final assembly of the apparatus.

The first catch means formed by the graduation 10 and a surface of guide member 8 is located within the opening 9 provided for the electrical cable in the closure portion 11. Such first catch means is positioned in such a way that the electrical cable 2 and 22 rests on this first catch means with the front edge portion of the sheathing material 22 being in abutting engagement therewith. The second catch means formed by the continuous projection 17 lies substantially axially opposite the first catch means. Further, the continuous projection 17 constituting the second latch means is configured so that it will press into the sheathing material 22. However, such second catch means will generally permit the electrical cable to move, but such movement is substantially limited to only the direction of the first catch means. This then means that normally after the initial introduction of the electrical cable 2 and 22 into the cable lead-through device, such electrical cable will be substantially fixed in the direction of its longitudinal axis. In addition, the continuous projection 17 constituting the second catch means, by also functioning in the manner of a seal, substantially prevents the undesirable penetration of foreign matter such as, for example, dirt and/or moisture, into the part of the closure openings 9 and 20 which lead into the interior portion of the housing. Depending upon the end application, such foreign matter could cause malfunctioning of the device while it is in service. It is also advantageous that the strain relief device of one of the presently preferred embodiments of the invention include the guide member 8 having a curved surface, as illustrated in FIG. 1, for the at least one conductor wire 2 or conductor wires of the electrical cable. This guide member 8 is used if and when the electrical cable is to be passed radially out of the housing member or out of the sealing part of such housing member.

In an application where the cable lead-through device is configured for a radial exit of the electrical cable from the housing, the cable lead-through device, according to one particularly advantageous embodiment of the present invention, includes a projecting portion 19 which is connected to the closure portion 11 for the housing. This projecting portion 19 extends substantially transversely to the longitudinal axis of such closure portion 11, and thus likewise such projecting portion 19 runs substantially transversely to the longitudinal axis of the cup-shaped housing portion 1. The projecting portion 19 includes an opening 20 having a funnel-shaped end 21 for the electrical cable. The opening 20 connects to the opening 9 for receiving such electrical cable that is provided in the closure portion 11.

The opening 20, which is provided in the projecting portion 19, functions as a guide means for the electrical cable. As mentioned above, the opening 20 passing through the projecting portion 19 flares out into a funnel-shaped configuration adjacent its free end area 21, which leads to the outside. This funnel-shaped end 21 allows the electrical cable to be diverted during assembly and operation of the apparatus without any significant damage occurring to such electrical cable.

Of course, as would be understood by persons skilled in the electrical equipment art, an extension or projecting portion of this type may also be provided, if desired, of a closure portion for the cup-shaped housing portion 1, in the situation where the electrical cable is led out of the housing in the direction of the longitudinal axis of such housing.

In another advantageous embodiment of the present invention, the wall of the cup-shaped housing portion 1 adjacent one end thereof, includes a slot 23 which extends in the direction toward the free edge area of the cup-shaped housing portion 1 and 6 of the housing The slot 23 serves the function of receiving the projecting portion 19 that is provided on the closure portion 11, and which runs transversely to the longitudinal axis of the housing. A presently preferred configuration for the slot 23 is generally U-shaped.

The dimensions of he slot 23 are such that when viewed in a direction toward the longitudinal axis of the closure portion 11, such slot 23 extends over the major portion of the axial extension or projecting portion 19 of the closure portion 11. In other words, the slot 23 completely receives therein the projecting portion 19 relative to the greatest diameter of the latter. In addition, the slot 23 has the function of acting as a safeguard against a twisting action of the closure portion 11 after it has been inserted into place within the open end of the cup-shaped housing portion 1.

The closure portion 11, on its side which faces away from the cup-shaped housing portion 1, includes an annular projection 12 which extends radially outward. In a presently preferred embodiment, this annular projection 12 will rest like a cover upon the free rim area of the cup-shaped housing portion 1.

As is generally well known in the art, when using a cable lead-through device with a prior art type of strain relief device the problem of sealing the housing and thereby protecting an electrical component contained within such housing against exposure to foreign matter, which might be detrimental, is frequently encountered.

On the other hand, improvements which can be attributed to the present invention make it possible to achieve in a relatively simple and economical manner a proper seal of the interior of such housing, which contains an electrical component, against the entrance of such detrimental foreign matter hereto. In this manner, added protection is provided to such electrical component, thereby minimizing premature failure and/or malfunction. According to one presently preferred embodiment of the invention, in order to seal off the interior space of a housing which contains an electrical component, such as, an impulse tachometer generator, a sealing device is provided. This sealing device includes at least one elastomeric sealing element which is configured in such a manner that, on the one hand, it contacts the inside wall of the housing or a wall of an element located in the housing to form a seal; and on the other hand, such elastomeric sealing element contacts the conductor wire, or conductor wires directly in the case of a multiwire electrical cable.

Further, according to the presently preferred embodiment of the invention, a support member 26 is provided as a support or rest area for the sealing element. This support member 26 is connected with the closure portion 11 and is located on the side of such closure portion 11 that is facing the interior of the cup-shaped housing portion 1.

It is preferable that the support member 26 be configured as an annular body which is capable of accepting a first sealing element 4 and a second sealing element 27. This first sealing element 4 will have a disk-shape, while the second sealing element 27 will be ring-shaped. The first disk-shaped sealing element 4 is positioned within the space that is defined by the annular body and, on the one hand, the first disk-shaped sealing element 4 rests with its peripheral surface, or with continuous sealing projections provided on its peripheral surface, on the inside shell surface of the annular body and, on the other hand, such first disk-shaped sealing element 4 includes one or more openings for one or more conductor wires of the electrical cable; such opening or openings in the first disk-shaped sealing element 4 being oriented in the direction of its longitudinal axis. It is preferred that each opening be configured and positioned in a manner such that each wall bounding an opening sealingly engages a conductor wire 2 of the electrical cable. The second ring-shaped sealing element 27 is positioned to make sealing engagement with the outer shell surface of the annular body with its inside surface, and its outside surface sealingly contacts the inside surface of the cup-shaped housing portion 1

In one presently preferred embodiment, the annular body, which functions is the support member 26 for the first and second sealing elements 4 and 27, respectively, may be configured as an annular extension of the housing member closure portion 11, and thus forms a single structural unit with such closure portion 11. In this manner, an economical molded unit can be utilized.

Of course, it is also within the scope of the present invention to provide only a disk-shaped sealing element 4 which will fulfill the previously described sealing function at the conductor wire 2 or conductor wires of the electrical, and at the inside wall of the housing. In this case, a support member 26 with a planar surface is provided at the closure part against which the disk-shaped sealing element 4 rests.

The combined effect of the arrangement of a sealing element having this particular type of design, and being positioned in this manner with the strain relief device for the electrical cable has, on the one hand, the distinct advantage of obtaining a cable lead-through device that substantially guarantees a secure strain relief for the electrical cable and, on the other hand, has a more reliable sealing of the space which contains the electrical component. In this arrangement, sealing effect of the sealing element is not greatly compromised even in the event of electrical cable deformation due to tensile stress. The reason for this is that a direct seal at the conductor wire or conductor wires of the electrical cable is provided.

While a number of presently preferred and alternative embodiments of the cable lead-through device of the present invention have been discussed n detail above, it should be obvious to those persons who are skilled in the electrical equipment art that various other modifications and adaptations of the present invention can be accomplished without departing from the spirit and scope of the appended claims.

I claim:

1. An apparatus which includes a cable lead-through device comprising:
    (a) a housing, said housing including:
        (i) a cup-shaped housing portion having a bottom, and
        (ii) a closure portion on a side opposite to the bottom to close off an interior portion of said cup-shaped housing portion;
    (b) at least one electrical component disposed within said cup-shaped housing portion;
    (c) an electrical cable connected at a first end thereof to said electrical component, said electrical cable passing through said housing for connection at a second end thereof to an electrical device located externally to said housing, said electrical cable having at least one conductor wire surrounded by a sheathing material; and
    (d) a strain relief means engageable with said electrical cable for minimizing damage to at least one of said electrical cable and said electrical component, said strain relief means including:
        (i) a pair of opposingly movable elements for clamping said electrical cable in a predetermined position, said pair of elements being biased against an inside wall of said cup-shaped housing portion, and
        (ii) one of said pair of elements of said strain relief means forming said closure portion for said cup-shaped housing portion.

2. An apparatus which includes a cable lead-through device, according to claim 1, wherein said pair of elements for clamping said electrical cable are pretensioned and positioned substantially vertically to said inside wall of said cup-shaped housing portion.

3. An apparatus which includes a cable lead-through device, according to claim 2, wherein said electrical cable is passed radially out of said housing.

4. An apparatus which includes a cable lead-through device, according to claim 1, wherein said electrical cable is passed out of said housing in a direction of a longitudinal axis of said housing.

5. An apparatus which includes a cable lead-through device, according to claim 1, wherein said one of said pair of elements of said strain relief means forming said closure portion for said cup-shaped housing portion includes an axial extension, at least a portion of which is engaged with said cup-shaped housing portion adjacent an open end thereof.

6. An apparatus which includes a cable lead-through device, according to claim 5, wherein said closure portion includes an opening to enable passing said electrical cable out of said housing.

7. An apparatus which includes a cable lead-through device, according to claim 6, wherein said closure portion includes a recess which runs substantially transversely to a longitudinal axis of said opening for passing said electrical cable out of said housing, said recess extending substantially from an outer shell surface of said closure portion to said opening and terminating in same.

8. An apparatus which includes a cable lead-through device, according to claim 7, wherein the other of said pair of opposingly movable elements is a clamping means disposed in said recess of said closure portion in a direction transverse of said electrical cable for clamping said electrical cable in place.

9. An apparatus which includes a cable lead-through device, according to claim 8, wherein said clamping means and said recess cooperate in a manner such that said clamping means is guided in said closure portion by at least a portion of a wall section bounding said recess.

10. An apparatus which includes a cable lead-through device, according to claim 9, wherein said clamping means is dimensioned in a direction of its longitudinal axis that extends to said electrical cable such that after insertion of said closure portion into said cup-shaped housing portion, said clamping means is braced with its end facing away from said electrical cable against said inside wall of said cup-shaped housing portion.

11. An apparatus which includes a cable lead-through device, according to claim 10, wherein said clamping means, on its side facing said electrical cable, presses said electrical cable against at least one of a section of a wall bounding said opening and a member connected to said wall bounding said opening while elastically deforming said electrical cable.

12. An apparatus which includes a cable lead-through device, according to claim 11, wherein said recess for receiving said clamping means, as viewed in a direction of a longitudinal axis of said closure portion, is located in such a way that after insertion of said closure portion into said cup-shaped housing portion, said recess will be located in an area of said closure portion that is surrounded by said cup-shaped housing portion.

13. An apparatus which includes a cable lead-through device, according to claim 11, wherein said clamping means and said recess for receiving said clamping means and said section of said wall of said closure portion bounding said opening for said electrical cable form said strain relief means for said electrical cable.

14. An apparatus which includes a cable lead-through device, according to claim 8, wherein said closure portion, on its side which faces said interior portion of said cup-shaped housing portion, is connected to a support member for at least one sealing device, and a sealing device is positioned such that it seals off said interior portion of said cup-shaped housing portion against said opening for said electrical cable and against said recess for said clamping means.

15. An apparatus which includes a cable lead-through device, according to claim 14, wherein said sealing device is further positioned in such a way that it contacts and forms a seal at said at least one conductor wire of said electrical cable, and contacts and forms a seal with at least one of said support member and said inside wall portion of said cup-shaped housing portion.

16. An apparatus which includes a cable lead-through device, according to claim 1, wherein said closure portion includes an opening for said electrical cable and a projecting portion, said opening for said electrical cable passing through said projecting portion in a direction of a longitudinal axis of said projecting portion.

17. An apparatus which includes a cable lead-through device, according to claim 3, wherein said closure portion includes an opening for said electrical cable and a projecting portion, said opening for said electrical cable passing through said projecting portion in a direction of a longitudinal axis of said projecting portion.

18. An apparatus which includes a cable lead-through device, according to claim 4, wherein said closure portion includes an opening for said electrical cable and a projecting portion, said opening for said electrical cable passing through said projecting portion in a direction of a longitudinal axis of said projecting portion.

19. An apparatus which includes a cable lead-through device, according to claim 13, further including a projecting portion having an opening for said electrical cable oriented in a direction of a longitudinal axis of said projecting portion, said projecting portion engaging said closure portion adjacent to said opening in said closure portion and said opening of said projecting portion communicating with the opening in said closure portion.

20. An apparatus which includes a cable lead-through device, according to claim 15, further including a projecting portion having an opening for said electrical cable oriented in a direction of a longitudinal axis of said projecting portion, said projecting portion engaging said closure portion adjacent to said opening in said closure portion and said opening of said projecting portion communicating with the opening in said closure portion.

21. An apparatus which includes a cable lead-through device, according to claim 6, wherein said opening for said electrical cable located in said closure portion includes a graduation, said graduation functioning as a first catch means for engaging a face of said sheathing material surrounding said at least one conductor wire, said graduation being positioned in a side of said opening which is opposite a free end of said opening emerging from said closure portion.

22. An apparatus which includes a cable lead-through device, according to claim 13, wherein said opening for said electrical cable located in said closure portion includes a graduation, said graduation functioning as a first catch means for engaging a face of said sheathing material surrounding said at least one conductor wire, said graduation being positioned in a side of said opening which is opposite a free end of said opening emerging from said closure portion.

23. An apparatus which includes a cable lead-through device, according to claim 15, wherein said opening for said electrical cable located in said closure portion includes a graduation, said graduation functioning as a first catch means for engaging a face of said sheathing material surrounding said at least one conductor wire, said graduation being positioned in a side of said opening which is opposite a free end of said opening emerging from said closure portion.

24. An apparatus which includes a cable lead-through device, according to claim 16, wherein said opening for said electrical cable located in said closure portion includes a graduation, said graduation functioning as a first catch means for engaging a face of said sheathing material surrounding said at least one conductor wire, said graduation being positioned in a side of said opening which is opposite a free end of said opening emerging from said closure portion.

25. An apparatus which includes a cable lead-through device, according to claim 24, wherein on a side opposite said first catch means, a continuous projection which extends to said sheathing material of said at least one conductor wire is positioned in a wall bounding said opening, said continuous projection functioning as a second catch means for enabling introduction of said electrical cable into said opening in a direction of said first catch means while simultaneously preventing movement of said electrical cable in a direction away from said first catch means.

26. An apparatus which includes a cable lead-through device, according to claim 8, wherein said clamping means, on a side facing said electrical cable, includes at least one projection that extends to said electrical cable.

27. An apparatus which includes a cable lead-through device, according to claim 13, wherein said clamping means, on a side facing said electrical cable, includes at least one projection that extends to said electrical cable.

28. An apparatus which includes a cable lead-through device, according to claim 15, wherein said clamping means, on a side facing said electrical cable, includes at least one projection that extends to said electrical cable.

29. An apparatus which includes a cable lead-through device, according to claim 8, wherein a wall in said closure portion bounding said opening for said electrical cable includes a cavity located on a side of said opening opposite said recess for said clamping means.

30. An apparatus which includes a cable lead-through device, according to claim 13, wherein a wall in said closure portion bounding said opening for said electrical cable includes a cavity located on a side of said opening opposite said recess for said clamping means.

31. An apparatus which includes a cable lead-through device, according to claim 26, wherein a wall in said closure portion bounding said opening for said electrical cable includes a cavity located on a side of said opening opposite said recess for said clamping means.

32. An apparatus which includes a cable lead-through device, according to claim 16, wherein a wall of said cup-shaped housing portion includes a slot which runs in a direction of a longitudinal axis of said cup-shaped housing portion, said slot extending over a major portion of an axial length of said closure portion and being open toward an edge of said cup-shaped housing portion which points toward said closure portion, said slot being positioned to receive said projecting portion and to act as a means for preventing twisting of said closure portion.

33. An apparatus which includes a cable lead-through device, according to claim 25, wherein a wall of said cup-shaped housing portion includes a slot which runs in a direction of a longitudinal axis of said cup-shaped housing portion, said slot extending over a major portion of an axial length of said closure portion and being open toward an edge of said cup-shaped housing portion which points toward said closure portion, said slot being positioned to receive said projecting portion and to act as a means for preventing twisting of said closure portion.

34. An apparatus which includes a cable lead-through device, according to claim 20, wherein said support member for said sealing device consists of a projection of said closure portion, said projection being positioned on a side of said closure portion which faces said interior portion of said cup-shaped housing portion and extending toward said interior portion of said cup-shaped housing portion.

35. An apparatus which includes a cable lead-through device, according to claim 34, wherein said projection is an annular body member.

36. An apparatus which includes a cable lead-through device, according to claim 14, wherein said support member for said sealing device is a separate element that is held in place on a portion of said cup-shaped housing portion.

37. An apparatus which includes a cable lead-through device, according to claim 14, wherein said sealing device consists of a first sealing element and a second sealing element.

38. An apparatus which includes a cable lead-through device, according to claim 37, wherein said first sealing element is a disk-shaped body member, and said second sealing element is an annular body member.

39. An apparatus which includes a cable lead-through device, according to claim 38, wherein said first sealing element is positioned in a space bounded by said support member, and contacts and forms a seal on a wall of said support member with at least one of its peripheral surface and with continuous projections formed on said peripheral surface.

40. An apparatus which includes a cable lead-through device, according to claim 39, wherein said first sealing element includes at least one opening for said at least one conductor wire of said electrical cable, said at least one opening being positioned such that a wall bounding said at least one opening contacts said at least one conductor wire, thereby forming a seal.

41. An apparatus which includes a cable lead-through device, according to claim 40, wherein said second sealing element is mounted in at least one of on and in an outer shell surface of said support member, an inner side of said second sealing element contacting and forming a seal adjacent at least one of said shell surface and a groove of said support member in said shell surface, an outer surface of said second sealing element contacting and forming a seal on said inside wall of said cup-shaped housing portion.

42. An apparatus which includes a cable lead-through device, according to claim 1, wherein an outer surface of said closure portion includes at least one indentation for use in securing the closure portion against shifting with respect to the cup-shaped housing portion.

43. An apparatus which includes a cable lead-through device, according to claim 42, wherein a wall of said cup-shaped housing portion includes a tab which extends into said indentation in said outer surface of said closure portion.

44. An apparatus which includes a cable lead-through device, according to claim 43, wherein in an area of said indentation in said outer surface of said closure portion, said apparatus further includes a recess formed in said outer surface of said closure portion and a plate-like member positioned in said recess and extending between said outer surface of said closure portion and said inside wall of said cup-shaped housing portion, said plate-like member including an opening for said tab.

* * * * *